(12) United States Patent
Dhawan et al.

(10) Patent No.: US 9,667,733 B2
(45) Date of Patent: May 30, 2017

(54) DETERMINING RELEVANT CONTENT FOR KEYWORD EXTRACTION

(71) Applicant: Adobe Systems Incorporated, San Jose, CA (US)

(72) Inventors: Anmol Dhawan, Uttar Pradesh (IN); Walter W. Chang, San Jose, CA (US); Sachin Soni, New Delhi (IN); Ashish Duggal, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 262 days.

(21) Appl. No.: 14/638,737

(22) Filed: Mar. 4, 2015

(65) Prior Publication Data

US 2016/0261701 A1  Sep. 8, 2016

(51) Int. Cl.
| | | |
|---|---|---|
| *G06F 15/173* | (2006.01) | |
| *H04L 29/08* | (2006.01) | |
| *H04N 19/436* | (2014.01) | |
| *H04N 19/625* | (2014.01) | |
| *H04N 19/91* | (2014.01) | |
| *H04N 19/44* | (2014.01) | |
| *H04N 19/93* | (2014.01) | |

(52) U.S. Cl.
CPC ........... *H04L 67/22* (2013.01); *H04N 19/436* (2014.11); *H04N 19/44* (2014.11); *H04N 19/625* (2014.11); *H04N 19/91* (2014.11); *H04N 19/93* (2014.11); *H04L 67/02* (2013.01)

(58) Field of Classification Search
CPC ....... H04L 67/22; H04L 67/02; H04N 19/436; H04N 19/625; H04N 19/91; H04N 19/44; H04N 19/93
See application file for complete search history.

(56) References Cited

U.S. PATENT DOCUMENTS

| | | | | |
|---|---|---|---|---|
| 7,660,815 B1 * | 2/2010 | Scofield | ............ | G06F 17/30702 707/999.102 |
| 7,774,335 B1 * | 8/2010 | Scofield | ............ | G06F 17/30864 707/709 |
| 7,797,421 B1 * | 9/2010 | Scofield | ................ | G06F 15/173 709/203 |
| 8,005,716 B1 * | 8/2011 | Desikan | ................. | G06Q 30/02 705/14.54 |
| 8,386,509 B1 * | 2/2013 | Scofield | ............ | G06F 17/30699 707/706 |
| 8,688,697 B1 * | 4/2014 | Nayar | ................ | G06Q 30/0601 707/731 |

(Continued)

OTHER PUBLICATIONS

AlchemyAPI—Keyword Extraction API, Web page <http://www.alchemyapi.com/products/alchemylanguage/keyword-extraction>, 2 pages, Sep. 28, 2014, retrieved from Internet Archive Wayback Machine <https://web.archive.org/web/20140928122328/http://www.alchemyapi.com/products/alchemylanguage/keyword-extraction/> on Dec. 30, 2015.

*Primary Examiner* — Krisna Lim

(74) *Attorney, Agent, or Firm* — Keller Jolley Preece

(57) ABSTRACT

The present disclosure is directed toward systems and methods for analyzing user-specific information and determining content within one or more web pages that has been experienced by one or more users. Furthermore, the present disclosure is directed toward identifying and providing actionable data based on keywords experienced by one or more users.

20 Claims, 7 Drawing Sheets

(56) References Cited

U.S. PATENT DOCUMENTS

2014/0143655 A1\* 5/2014 Alon .................. G06Q 30/0202
715/234
2015/0106156 A1\* 4/2015 Chang ................ G06Q 30/0201
705/7.29
2015/0106157 A1\* 4/2015 Chang .................... G06F 17/27
705/7.29

\* cited by examiner

DETERMINING RELEVANT CONTENT FOR KEYWORD EXTRACTION

CROSS REFERENCE TO RELATED APPLICATIONS

N/A

BACKGROUND

1. Technical Field

One or more embodiments described herein relate generally to tracking web data requests and enhancing analytics metrics. More specifically, one or more embodiments relate to extracting relevant keywords from web content and providing web traffic analytics based on the extracted keywords.

2. Background and Relevant Art

Modern websites typically include multiple web pages that a user transitions through via hyperlinks connecting one web page to another. For example, a website generally has a home page including multiple hyperlinks that direct a user to other web pages within the website. Accordingly, a user can transition from the home page to another web page within the website by clicking on a provided hyperlink. In this way, a website user can navigate the website to, for example, search for a particular product, review product pages, comment in a forum, purchase a product, and so forth.

Generally, the main goal of a website manager (i.e., a web master) is to attract visitors to the website, and provide engaging content within the website such that website visitors will "click through" the web pages of the website, purchasing goods offered on the website, commenting on posts hosted by the website, interacting with multi-media or advertisements offered by the website, etc. For this reason, website managers typically utilize various tools to assist them in analyzing website traffic. These analysis tools help website managers understand how website visitors enter the website, what web pages within the website are most frequently visited by website visitors, and the hyperlinks utilized by website visitors as they click through the website. By coming to a better understanding of website traffic, a website manager can determine which web pages/content is most attractive to website visitors and/or learn how to improve the website to increase web traffic.

Of particular interest to a website manager is "user fallout," which refers to the point within a website from which a website visitor leaves the website. Ideally, a website manager of a commercial website would prefer that most users leave, or fallout of, a website only after utilizing the website to purchase a product. A problem arises however, when website visitors fall out of a website at some point prior to purchasing a product. Existing website traffic analysis tools indicate to a website manager the web pages from which website visitors leave the website (i.e., to go to another website, or to leave the Internet), but are not always able to give any further information as to why the website visitors left. For example, a website manager may determine, by utilizing existing analysis tools, that following a recent re-design a website is experiencing a ten percent increase in user fallout from the home page of the website. Beyond this information, however, existing analysis tools generally give the website manager limited indications as to why the re-design of the website is causing this increase in home page user fallout.

Also of great interest to a website manager is the path a website visitor takes through a website from initial entry to eventual fallout. For example, a website visitor may initially enter a website by visiting the website's home page (e.g., www.website.com/home.htm), and then may click through various web pages within the website before coming to a last web page within the website from which the user leaves the website altogether (i.e., the user falls out). By analyzing the website visitor's path through the website, the website manager can gain useful insights into which web pages within the website are of most interest to website visitors, and/or connections between the web pages. Another problem arises, however, in that existing analysis tools provide no clues as to why a website visitor takes a certain path through the website. Accordingly, a need exists not simply for web traffic data, but rather for actionable web traffic data that indicates to a web manager why website visitors are clicking through and eventually falling out of a website.

Thus, current methods of providing web traffic data analyses include several disadvantages that lead to ineffective web traffic analysis and website management.

SUMMARY

One or more embodiments described herein provide benefits and/or solve one or more of the foregoing or other problems in the art with systems and methods that provide users with indications as to why website visitors take certain paths through a website. More specifically, one or more embodiments involve identifying specific web content experienced by a user at every step along the user's path through the website, including specific web content experience by the user immediately before the user falls out of the website. For example, one embodiment identifies specific web content experienced by a user on a particular web page and extracts keywords from the identified content. The systems and methods track the extracted keywords from the particular web page, as well as the next page the user transitions to within the website. In this way, systems and methods described herein can infer how certain keywords affect a path taken by a user through a website, and provide website managers with an indication as to why a user transitions from one web page to another.

Additionally, systems and methods described herein can extract keywords from web content experienced by a user immediately before the user leaves, or falls out of, the website. For example, an embodiment can monitor web content experienced by a user while the user is on a certain web page. If the user exits the website from that certain web page, an embodiment can determine web content experienced by the user within a threshold amount of time immediately preceding the user's exit from the website. In this way, the disclosed systems and methods can identify particular keywords experienced by the user leading up to the user's fallout from the website. This information can inform a web manager as to particular keywords that influence user fallout.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which.

DETAILED DESCRIPTION

Figure 1:
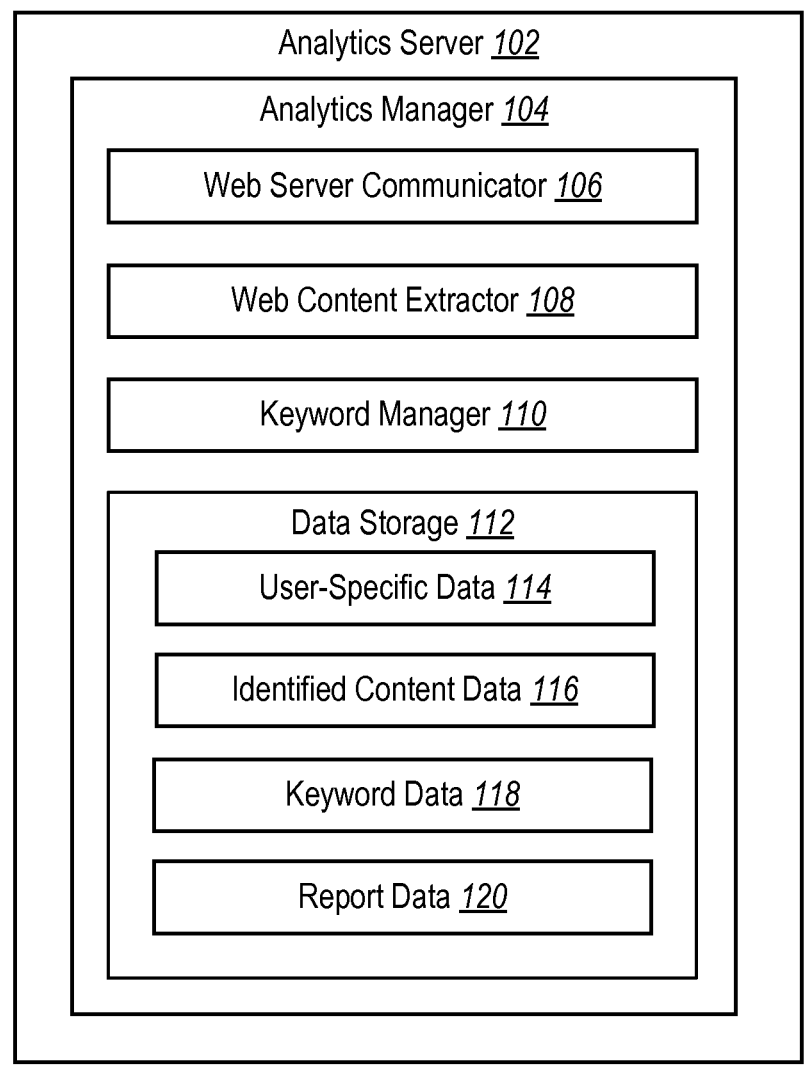
FIG. 1 illustrates a schematic diagram of an analytics system in accordance with one or more embodiments

One or more embodiments described herein include an analysis system that allows website managers to easily identify actionable web traffic data within a given website. More specifically, the analysis system described herein provides website managers with actionable keywords within a website visitor's navigation path through a website. For example, the analysis system can identify web content experienced (i.e., read, watched, clicked, etc.) by a user on a particular web page and extract keywords from the experienced content. By extracting keywords from experienced content in all the web pages visited by the user in a website, the analysis system can determine how certain keywords effect the user's navigation path through the website. Additionally, by extracting keywords from web content experienced by the user immediately preceding the user's fallout from the website, the analysis system can determine how the extracted keywords correlate to overall user fallout.

In one or more embodiments, the analysis system can begin by identifying a navigation path taken by a website user starting at the user's entry point into the website, and ending with the user's fallout point from the website. For example, a user's navigation path through a particular website may begin at the website's home web page, then may include a sequence of web pages within the website (e.g., a product web page, a payment options web page, a purchase web page, etc.), and may end at a purchase confirmation web page, following which the user leaves the website. The analysis system can identify navigation paths for every website visitor over a period of time.

Next, the analysis system described herein can identify web page content experienced by a user on each navigated web page within the website. In one or more embodiments, the analysis system can determine what portions of a web page the user has looked at (i.e., read) by analyzing the user's scrolling behavior, eye movements, or other web page interactions (e.g., mouse hovers, touch gestures, etc.). Once the analysis system has identified content within a web page that the user has experienced, the analysis system can extract and weight one or more keywords from the identified content. The analysis system can extract and weight one or more keywords from the identified content based on the amount of time the user spent reading the identified content, as well as based on the importance of the one or more keywords within the identified content. The analysis system can identify, extract, and weight one or more keywords from every web page visited in every identified navigation path for all website users over a period of time.

Once the analysis system has identified both the various navigation paths taken by users through the website and the one or more keywords from each of the visited web pages represented in the identified navigation paths, the analysis system can synthesize this information into an analysis table that tracks keywords that lead to and away from web pages within a website. For example, in one embodiment, a user may land on a website's homepage, scroll through the homepage until the user comes to a block of content that includes the keyword "camera." After the user reads the block of content, the user may click on a hyperlink that transfers him to a web page within the website that is dedicated to cameras. Accordingly, the analysis system can infer that the keyword "camera" was influential in a user's decision to 1) transfer away from the website's homepage, and 2) transfer to the website's web page dedicated to cameras. As such, the analysis system can associate the keyword "camera" with the homepage in the analysis table as a keyword that leads users away from the homepage. The analysis system can also associate the keyword "camera" with the web page dedicated to cameras as a keyword that lead users to that web page.

The analysis system can repeat the process described above for all web traffic. For example, the system can perform this process for all website users and all extracted keywords until the analysis table is reliably representative of sequences of keywords that influence every step through a website in any particular website user's navigation path. The analysis table can also include weights associated with each keyword. As such, with sequences of weighted keywords corresponding to navigation paths through a website, the analysis system can provide various reports to a website manager that indicate how certain keywords affect website users. For example, the analysis system can provide a report for a particular web page within the website that details prominent keywords that lead users to that web page. Furthermore, the analysis system can provide a report detailing keywords that lead to users exiting the website, a report detailing keywords that lead users away from a particular page or pages, a report detailing prominent entry and exit keywords, a report detailing keywords encountered along a user's full navigation path through a website, or a report detailing keywords that are most heavily weighted.

FIG. 1 illustrates a schematic diagram illustrating an example embodiment of the analysis system 100. As shown, the analysis system 100 can include various components for performing the processes and features described herein. For example, as shown in FIG. 1, the analysis system 100 may include an analytics server 102 hosting an analytics manager 104. The analytics manager 104 can include a web server communicator 106, a web content extractor 108, a keyword manager 110, and a data storage 112. The data storage 112 can store user-specific data 114, identified content data 116, keyword data 118, and report data 120. Although the disclosure herein describes the components 102-112 as separate components, as illustrated in FIG. 1, any of the components 102-112 may be combined into fewer components, such as into a single facility or module, or divided into more components as may serve one or more embodiments.

Each of the components 102-112 of the analysis system 100 can be implemented using a computing device including at least one processor executing instructions that cause the analysis system 100 to perform the processes described herein. In some embodiments, the components 102-112 of the analysis system 100 can be implemented by a single server device (e.g., analytics server 102), or across multiple server devices. Additionally or alternatively, a combination of one or more service devices and one or more client devices can implement the components 102-112 of the analysis system 100. Furthermore, in one embodiment, the components 102-112 of the analysis system 100 can comprise hardware, such as a special-purpose processing device to perform a certain function. Additionally or alternatively, the components 102-112 of the analysis system 100 can comprise a combination of computer-executable instructions and hardware.

One or more embodiments can partially implement the analysis system 100 as a native application installed on a client computing device. For example, the analysis system 100 may include a mobile application that installs and runs on a mobile device, such as a smart phone or a tablet. Alternatively, the analysis system 100 can include a desktop application, widget, or other form of a native computer program. Alternatively, the analysis system 100 may be a remote application that a client computing device accesses. For example, the analysis system 100 may include a web application that is executed within a web browser of a client computing device.

As mentioned above, and as illustrated in FIG. 1, the analysis system 100 can include an analytics server 102. The analytics server 102 can receive and provide, or "serve," various types of data in response to user requests, and can store log files associated with user requests. In one or more embodiments, the analytics server 102 can communicate with a web server to receive web server log files. For example, a web server can collect data related to user requests (e.g., time stamps, web page requests, scroll positions, hyperlink clicks, media interactions, etc.) for data related to one or more web pages within a website. Additionally, the web server can maintain log files containing information related to the user requests received by the web server.

Additionally or alternatively, rather than receiving web server log files, the analytics server 102 can receive information via page tagging. For example, a web page may include a tracking pixel, web bug, or another type of code that activates when a user opens the web page, or performs some other event in relation to the web page (e.g., clicks a hyperlink, interacts with a control, initiates a multimedia element, etc.). The page tag embedded in the web page can automatically report the event back to the analytics server 102. In one or more alternative embodiments, the analytics server 102 may actually include multiple servers working in cooperation with each other.

The web server and/or analytics server 102 can organize, compile, and/or store log files and other reported information according to a range of time associated with the data in each log file and/or the other reported information, according to one or more users associated with the data in each log file and/or the other reported information, according to the type of data in each log file and/or the other reported information, and so forth. In one or more embodiments, the analytics server 102 can request one or more log files from a web server in order to perform an analysis of the data contained therein. In one embodiment, the analytics server 102 may request one or more log files in response to a command received from a user via a client computing device. Additionally or alternatively, the analytics server 102 may request log files from a web server on a regular schedule (i.e., once a day, every hour, etc.) and not in response to a command received from a user.

As mentioned above, the analytics server 102 can host the analytics manager 104, which in turn can include the web server communicator 106. In one or more embodiments, the web server communicator 106 can parse web server log files and other reported information received by the analytics server 102 directly and/or from one or more web servers in order to determine a user's navigation through a website. For example, as described above, a website can include one or more web pages that are linked together via hyperlinks. Accordingly, a user can initially land on the website by visiting a particular web page within the website, and then may continue on to visit other web pages within the website until the user eventually exits the website (i.e., falls out). As used herein, a user's "navigation path" through a website refers a sequence or a portion of a sequence of web pages a user visits within the website, from initially landing on the website to eventually falling out of the website.

In one or more embodiments, the web server communicator 106 can determine a user's navigation path through a website by parsing a web server log file based on a particular user's identification information. For example, a web server log file may include a list of web page requests received by the web server over a period of time. Each logged web page request may include information specific to the user who made the request (e.g., an IP address specific to the user, a screen name specific to the user, a user ID specific to the user, etc.). In one embodiment, the web server communicator 106 can parse the log file based on a user's identification information in order to identify a list of web pages requests specific to that user. The web server communicator 106 can utilize timestamps associated with each web page request to construct a sequence of web page visits corresponding to the web page requests made by the user. Additionally or alternatively, the web server communicator 106 can similarly parse information reported to the analytics manager 104 via one or more embedded page tags (i.e., via tracking pixels, web bugs, etc.).

The web server communicator 106 can also parse web server log files and/or reported information to identify information indicative of a user's interactions with a particular web page. In one or more embodiments, a user can interact with a web page by scrolling through a web page, stopping at a particular scroll position within the web page, interacting with a feature of the web page, etc. As mentioned above, the web server log files and/or other reported information may include sophisticated data related to user interactions with web pages within a website including information indicating: time spent by a user on a web page, the user's scroll behavior within the web page, time spent by the user at a particular scroll position within the web page, etc. Furthermore, a web server log file and other reported information can include information indicative of a user's interactions with a multimedia feature within a web page (e.g., a media player, a Flash feature, a Java applet, etc.) such as information indicating web page elements clicked on by the user, web page elements hovered over by the user, etc. The web server communicator 106 can parse the log file and other reported information based on this data to determine the how the user has interacted with a particular web page.

Furthermore, the web server communicator 106 can parse web server log files and other reported information based on user eye movement. In one or more embodiments, the web server log files and other reported information contain eye-tracking data. For example, in one embodiment, a user may be utilizing a mobile phone to browse a web page that includes embedded code instructing the mobile phone's front-facing camera to capture images (e.g., via either still images or video) of the user's eyes as the user browses through the content of the web page. The web server communicator 106 can correlate the eye tracking data (i.e., the still images and/or video of the user's eyes) with other reported or logged data, such as scroll position data. As will be described in greater detail below, the analytics manager 104 can use this correlated data to determine particular content within a web page that has been experienced (i.e., read or looked at) by a user.

As described above, the web server communicator 106 can parse web server log files and other reported information to identify navigation path-related data for a website user over a particular period of time. In one or more embodiments, the web server communicator 106 can repeat the parsing processes described above on multiple web server log files and reported information in order to identify navigation path-related data for all website users over a particular period of time. Thus, after parsing one or more web server log files and other reported information, the web server communicator 106 can identify a navigation path through the website for every website user over a period of time; each navigation path including the particular user's entry point into the website, the particular user's exit point from the website, and every web page visited by the particular user in between the entry point and the exit point. Additionally, the web server communicator 106 can parse one or more web server log files and other reported information to identify information indicative of web page interactions of one or more users of the website. In this way, the web server communicator 106 can identify user-specific information for all website users over a period of time.

Alternatively or additionally, rather than parsing web server log files and other reported information to identify user-specific information, the web server communicator 106 can directly receive user-specific information from the web server or a page tag that does not require parsing. For example, in one or more embodiments, the web server communicator 106 can receive periodic reports directly from the web server or from user devices (e.g., through a page tag) every time a new user lands on a particular website, interacts with the particular website (e.g., clicks a hyperlink, activates embedded code, stops at a scroll position for a given amount of time, etc.), or leaves the website. The web server communicator 106 can receive and organize these reports based on identifying information related to a particular website user. Accordingly, in a similar manner as described above, the web server communicator 106 can identify user-specific information indicative of multiple user's navigation paths through a website, as well as the interactions of multiple users within the website. As used herein, "user-specific information" refers to data received or parsed from log files or directly reported information that is specific to a particular user (e.g., page lands, entry points, exit points, hyperlink clicks, scrolling data, eye tracking data, web page interactions, etc.).

As mentioned above, the analytics manage 104 can also include the web content extractor 108. The web content extractor 108 can utilize the user-specific information identified by the web server communicator 106 to identify specific content experienced by a website user within a given web page. As used herein, a user "experiences" web page content by viewing the content (e.g., as with an image), reading the content (e.g., as with a block of text), interacts with the content (e.g., as with a web form containing radio buttons and text boxes), etc. In one or more embodiments, the web content extractor 108 can identify specific content experienced by a user by analyzing information indicative of the user's scroll behavior related to a particular web page. Information that is indicative of the user's scroll behavior can include total time spent by the user on the web page, the time spent by the user at a particular scroll position within the web page, the time that elapses between particular scroll positions within the web page, etc.

The web content extractor 108 can analyze the user's scroll behavior in association with the content of the web page in order to determine specific content experienced by the user. For example, the web content extractor 108 can determine that the user stayed at a particular scroll position within a web page for a certain amount of time. In one or more embodiments, an amount of time a user spends at a particular scroll position, above a threshold amount, indicates the user has experienced the content within the web page at that particular scroll position. The threshold amount can be determined by the web content extractor 108, or may be configured by a web manager utilizing the analytics system 100. Thus, by identifying the content within the web page at the particular scroll position, the web content extractor 108 can determine that the user experienced the identified content. In one or more embodiments, the web content extractor 108 can take display information into account (i.e., display size of the computing device being used to view the web page, browser window size, etc.) when determining specific content within a web page at a particular scroll position.

In additional or alternative embodiments, the web content extractor 108 can identify specific content experienced by a user by analyzing user-specific information indicative of a user's eye movement relative to a given web page. It is generally known that, while reading a block of text, a user's eyes do not move in a constant, smooth progression across the lines of text within the block. Rather, a user's eyes tend to dart from one word or section to the next. The term "fixations" generally refer to the stationary moments inbetween the eye darts, while the term "saccades" general refer to the movements (i.e., the darting of the eyes) between each fixation. In one or more embodiments, the web content extractor 108 can analyze the eye movement related information identified by the web server communicator 106 to identify fixations and saccades. In at least one embodiment, an identified fixation within a web page indicates a user has experienced the web page content corresponding with the location of the fixation. Accordingly, the web content extractor 108 can determine that the user experienced the web page content corresponding to the location of a fixation within a web page.

In additional or alternative embodiments, the web content extractor 108 can identify specific content experienced by a user in other ways. For example, in one embodiment, the web content extractor 108 can identify specific content experienced by a user by determining content within a web page that correlates with a user's touch gestures (i.e., content associated with a "pinch-out" or "reverse pinch" touch gesture indicates the user zoomed in on particular content). In another embodiment, the web content extractor 108 can identify specific content experienced by a user by identifying pupil dilation that correlates with specific web page content. Regardless of the method by which the web content extractor 108 identifies specific content experienced by a user, the web content extractor 108 can identify one or more pieces of content experienced by the user on a given web page. Furthermore, the web content extractor 108 can repeat the processes described above for all website visitors across all web pages within the website over a period of time so as to amass a repository of experienced web content, that the web content extractor 108 can organize by website user and/or web page.

As mentioned above, and as illustrated in FIG. 1, the analytics manager 104 can also include a keyword manager 110. The keyword manager 110 can identify specific keywords from the specific content experienced by a website user on a particular web page within the website. As used herein, a "keyword" is a word or concept associated with web content that is indicative of the topic of the content. For example, in one embodiment, a keyword can be a word taken from a block of text within a web page that indicates the topic of the block of the text. In another embodiment, a keyword can be a word not within a block of text that describes the block of text. In another embodiment, a keyword can be a metatag that describes a picture or other content within a web page. In yet another embodiment, a keyword can be a portion of a uniform resource locator within a hyperlink.

In one or more embodiments, the keyword manager 110 can utilize natural language processing to identify one or more keywords from specific content experienced by a user. Natural language processing refers to systems and methods for word and sentence tokenization, text classification and sentiment analysis, spelling correction, information extraction, parsing, meaning extraction, and question answering. In one embodiment, the keyword manager 110 utilizes natural language processing to identify a topic associated with specific content experienced by a user, to identify an important word within specific content experienced by a user, etc. The keyword manager 110 can organize the identified one or more keywords based on an associated web page and/or website user. As with the other processes described above, the keyword manager 110 can repeat the process of identifying keywords for all website users across all web pages within the website. In one embodiment, the keyword manager 110 can utilize interfaces provided by the Natural Language Toolkit ("NLTK") to aid in classification, tokenization, stemming, tagging, and parsing specific content.

Once the keyword manager 110 identifies one or more keywords from specific content experienced by the user, the keyword manager 110 can also assign a weight to each of the one or more identified keywords. In one or more embodiments, the keyword manager 110 can assign a weight to a keyword based on an amount of time spent by a user to experience the content from which the keyword was identified. For example, as described above, the web server communicator 106 can identify user-specific data related to an amount of time a user spends at a particular scroll position within a web page, or related to an amount of time a user's eyes are fixated on a particular area within a web page. The keyword manager 110 can assign a weight to a keyword that is directly proportional to the amount of time the user spent interacting with the web content associated with the keyword. In one or more alternative embodiments, the keyword manager 110 can further base a keyword's weight on other factors such as, but not limited to, the keyword's color, font size, prominence, etc. Keyword extraction and analysis can be performed by systems such as the Alchemy API (see e.g., http://www.alchemyapi.com/products/demo/alchemylanguage/).

The keyword manager 110 can also build an analysis table utilizing the identified user navigation paths and keywords. For example, as described above, the analysis table is representative of sequences of keywords that influence every step through a website in any particular website user's navigation path. In one or more embodiments, the keyword manager 110 begins construction of the analysis table by identifying, from the information analyzed and identified by the web server communicator 106 and the web content extractor 108, a first web page in a sequence of web pages visited by a user, the one or more weighted keywords that are associated with that first web page, as well as the second page in the sequence of web pages visited by the user. The keyword manager 110 can associate the one or more weighted keywords with the first web page within the analysis table, so as to indicate that the one or more weighted keywords lead the user away from the first web page. The keyword manager 110 can then associate the one or more weighted keywords with the second web page within the analysis table, so as to indicate that the one or more weighted keywords lead the user to the second web page. The keyword manager can repeat this process for every step in every navigation path through the website until the analysis table represents sequences of weighted keywords that have driven users through the website during a given period of time. This process is described in greater detail below with reference to FIG. 4.

The keyword manager 110 can also account for user fallout in the analysis table. As mentioned above, user fallout occurs when a user leaves a website, either to go to another website, or to log off the Internet entirely. The keyword manager 110 can synthesize fallout data into the analysis table by first identifying the web page from which the user falls out of the website, as well as the one or more weighted keywords experienced by the user within a threshold amount of time preceding the fallout. The keyword manager 110 can then associate the one or more weighted keywords with the identified web page, so as to indicate that the one or more weighted keywords lead to user fallout from the identified web page.

Once the keyword manager 110 completes construction of the analysis table, the keyword manager 110 can provide various reports based on the analysis table. For example, in one or more embodiments, the keyword manager 110 can provide a next-page flow report. The next-page flow report provides, for every web page visited by a website user, a list of prominent keywords that lead website users to that page. The keyword manager 110 can also provide a previous page report that provides, for every web page visited by a website user, a list of prominent keywords that lead website users away from that page. The keyword manager 110 can order these lists of keywords according to each keyword's associated weight.

The keyword manager 110 can also provide other types of reports based on the analysis table. For example, the keyword manager 110 can provide a report of prominent entry and exit keywords related to a website, fallout reports (e.g., keywords experienced by users just before they exited the website), summarized full navigation path reports (e.g., all keywords associated with a particular navigation path through the website), and enhanced time spent reports (e.g., includes the times associated with the keyword weights). The keyword manager 110 can provide any of the above reports in the form of a connecting keywords tag cloud, where the keyword manager 110 presents the keywords associated with the report along with an indication of each keyword's weight. The reports provided by the keyword manager 110 are described in greater detail below with reference to FIG. 5.

As mentioned above, and as illustrated in FIG. 1, the analytics manager 104 can also include a data storage 112. As shown, the data storage 112 can include user-specific data 114, identified content data 116, keyword data 118, and report data 120. In one or more embodiments, the user-specific data 114 can include data representative of the user-specific information, such as described herein. Similarly, in one or more embodiments, the identified content data 116 can include data representative of the identified content experienced by one or more users on one or more web pages, such as described herein. In one or more embodiments, the keyword data 118 can include data representative of the keywords extracted from the identified content, also as described herein. Finally, in one or more embodiments, report data 120 can include data representative of generated reports, such as described herein.

Figure 2:
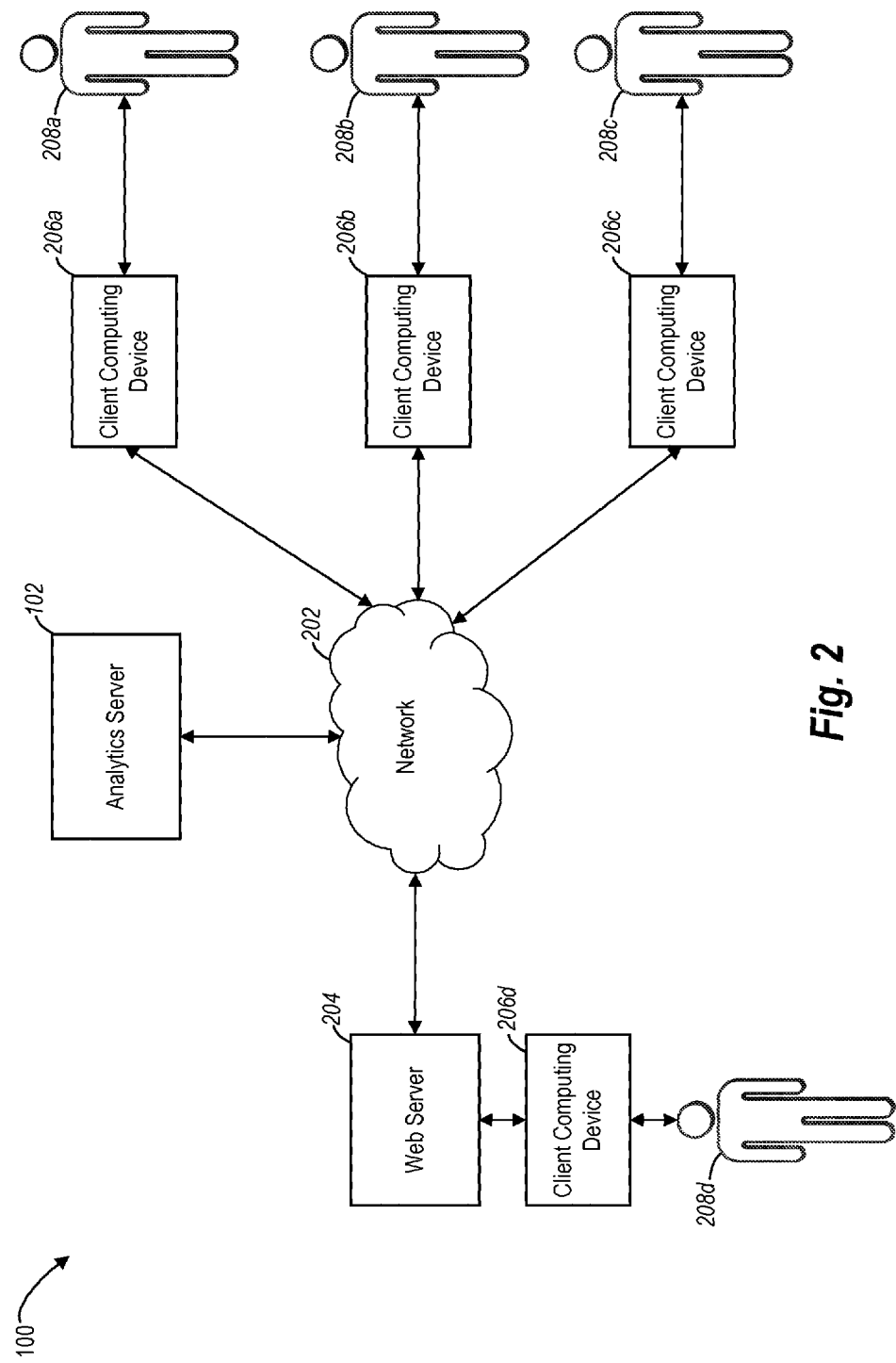
FIG. 2 illustrates a block diagram of an environments for implementing the analytics system of FIG. 1 in accordance with one or more embodiments.

FIG. 2 is a schematic diagram illustrating an environment for implementing the analysis system 100 in accordance with one or more embodiments. As illustrated in FIG. 2, the illustrated implementation of the analysis system 100 includes the analytics server 102, a network 202 (e.g., the Internet), a web server 204, client computing devices 206a, 206b, 206c, and 206d, as well as users 208a, 208b, 208c, and 208d. As further illustrated in FIG. 2, a client computing device can communicate with the web server 204 and/or the analytics server 102 through the network 108. Although FIG. 1 illustrates a particular arrangement of the users 208a-208d, the client computing devices 206-206d, the network 202, the web server 204, and the analytics server 102, various additional arrangements are possible.

While FIG. 2 illustrates four users 208a-208d and four client computing devices 206a-206d, the analysis system 100 can include more users and client computing devices. For example, in one or more embodiments, the analysis system 100 can handle data related to as many client computing devices as are supported by the web server 204. The users 208a-208d may be individuals (i.e., human users), businesses, groups, or other entities.

The client computing devices 206a-206d may include various types of computing devices. For example, the client computing devices 206a-206d can include a mobile device such as a mobile telephone, a smartphone, a PDA, a tablet, a laptop or a non-mobile device such as a desktop, a server, or another type of computing device. Further, the client computing devices 206a-206d may run web browser software. A web browser is a software application that allows a user to request, view, and interact with one or more web pages.

Additionally, in one or more embodiments, the client computing devices 206a-206d can communicate with the web server 204 through the network 202. In one or more embodiments, the network 202 may include the Internet or World Wide Web. The network 202, however, can include various other types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Example networks and network features are described below with reference to FIG. 6.

In one or more embodiments, the web server 204 can be a computer system that hosts data representative of one or more websites. As used herein, a "website" is simply a group of web pages organized under a hierarchy. As used herein, a "web page" is a document that, when delivered to a web browser, causes the web browser to display various components to a user of a client computing device. A user may interact with a web page by clicking on a hyperlink. As used herein, a "hyperlink" is an interactive element that references another web page that the user can navigate, or "link," to by clicking the hyperlink.

Each of the one or more websites hosted by the web server 204 can include web pages that are used for purposes such as data storage, gaming, retail, social networking, email, file transfer protocol (FTP), and so on. The web server 204 can utilize various communication protocols (e.g., hypertext transfer protocol or "HTTP") to receive requests for web pages. For example, the user 208a may send a request for a web page via a web browser associated with the client computing device 206a. The client computing device 206a can transmit the web page request to the web server 204 via the network 202. Upon receiving the web page request, the web server 204 can identify the data associated with the requested web page, and provide the identified data back to the client computing device 206a, where the web browser can display the requested web page.

The web server 204 can provide web data including hypertext markup language documents (i.e., "HTML"), which may include text, images, style sheets, scripts, etc. Additionally, the web server 204 can also receive content form a client computing device via an HTML document that features a web form (i.e., a control that allows a user to input data such as text that the web browser can transmit to the web server). In this way, users can receive and view web pages that include rich content including multimedia, formatted text, web forms, etc. For example, the user 208a can request web pages associated with a retail website from the web server 204 via the client computing device 206a. The web server 204 can provide web pages containing content describing and illustrating various retail products to the client computing device 206a. The user 208a can then utilize the functionality provided within the web pages to select and purchase one or more retail products. The web server 204 can receive and process the transaction details associated with the purchase.

In one embodiment, as mentioned above, the web server 204 stores data associated with the various data requests that it receives and processes. For example, as described above, the users 208a-208d may request web page data from the web server 204. Upon receiving a data request from a user, the web server 204 can store a log file that contains information related to the data request. The log file can contain information related to the web page request (e.g., identifying information related to the user who made the request), information related to hyperlinks clicked by a user, information related to multimedia interactions made by a user, information related to web form submissions made by a user, information related to file transfers initiated by a user, information related to scroll behavior of a user, information related to eye movement of a user, etc. Accordingly, the web server's log file can contain a complete record of each data request and corresponding user experience associated with a website hosted by the web server 204. In one or more embodiments, the web server 204 can store the log files chronologically so as to indicate a sequence of events.

As mentioned above, the web server 204 can provide log files and/or direct reports to the analytics server 102. Additionally as described above, the analytics server 102 can perform all of the functions described herein with respect to the web server 204. For example, the analytics server 102 may also receive log files and/or direct reports from one or more of the client computing devices 206a-206d via embedded page tags (e.g., tracking pixels, web bugs, etc.). Alternatively, in one embodiment, the analytics server 102 may be hosted on the web server 204.

In one or more embodiments, the web server 204 and/or the analytics server 102 can receive inputs and provide outputs via a terminal associated with the web server 204 and/or analytics server 102. For example, as shown in FIG. 2, the client computing device 206d can be a terminal for the web server 204. Accordingly, the user 208d (i.e., a website manager or a marketer of a brand that hosts or owns web page hosted by the web server 204) can interact with the web server 204 and/or the analytics server 102 via the client computing device 206d. Additionally, the analytics server 102 may provide the user 208d with graphical displays associated with keyword reports via a display of the client computing device 206d. Alternatively, rather than being associated with the web server 204, the client computing device 206d may be associated with the analytics server 102. In such a scenario, the user 208d holds an account with/subscription of a portal supported by the analytics server 102. The user 208d accesses the keyword reports via a portal hosted by the analytics server 102. Also alternatively, the web server 204 and/or the analytics server 102 may not require a terminal, but may have input/output means of their own, or alternatively may provide a virtual terminal that may be accessed by any user 208a-208c over the network 202 via a web browser.

As described above, the systems and methods performed by the analytics system 100 serve to identify actionable keywords within web pages of a website based on user-specific information. The keywords identified by the analytics system 100 can serve to help a website manager (i.e., a web master) understand why website users move from one web page to another, or why website users fall out of the website. By utilizing the actionable keywords provided by the analytics system 100, a website manager can optimize a website to not only ensure users take more efficient and/or effective navigation paths through the website, but to also minimize user fallout. The systems and methods of the analytics system 100 will now be explain in connection with a website in FIG. 3.

Figure 3:
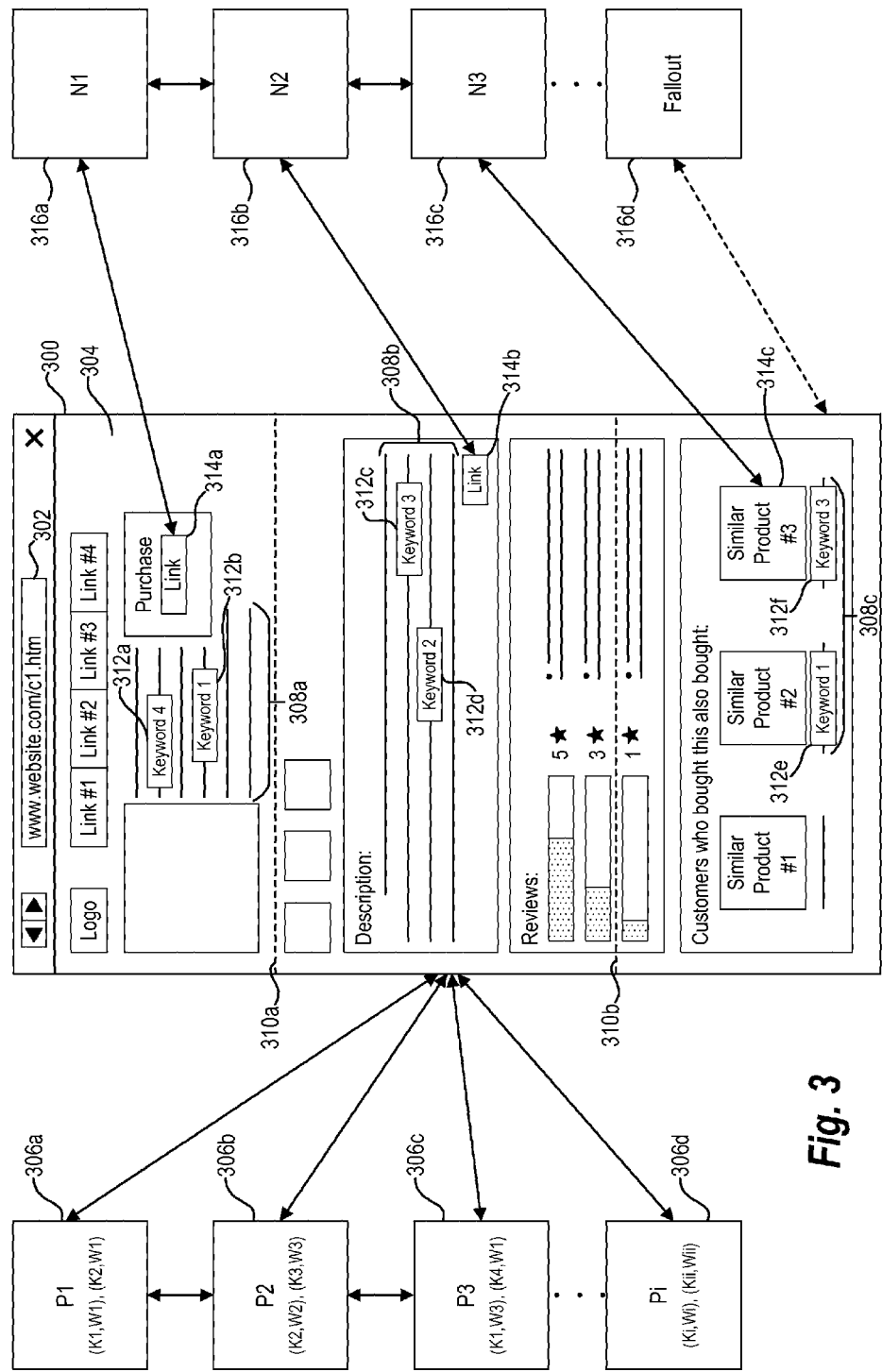
FIG. 3 illustrates one or more event sequences including at least one web page in accordance with one or more embodiments.

FIG. 3 illustrates a web browser 300 displaying a web page 304 (i.e., www.website.com/c1.htm"), as indicated by the uniform resource locator (URL) bar 302. The web page 304 is part of a commercial website and contains images, text, hyperlinks, and other content that is related to a particular product sold through the commercial website. Although FIG. 3 illustrates systems and methods of the analysis system 100 in connection with a commercial website, the systems and method of the analysis system 100 can function in connection with any type of website (e.g., social network, FTP, informational, etc.).

As described above, a website user may transfer to the web page 304 from another previous web page within the website. For example, as shown in FIG. 3, the user may have transferred to the web page 304 from any of the previous web pages 306a, 306b, 306c, or 306d. In one embodiment, the analytics manager 104 has extracted one or more keywords from each of the previous web pages 306a-306d, and assigned a weight to each extracted keyword (e.g., the analytics manager 104 has extracted keywords "K1" and "K2" at weights "W1" and "W2" from the previous web page "P1," and so forth). By way of example, the previous page 306a (i.e., "P1") may be the website's home page and may include a hyperlink that, when clicked by a user, transfers the user to the web page 304. Similarly, the previous page 306b (i.e., "P2") may be a web page for a product similar to the product featured in the web page 304 and may include a hyperlink that transfers the user to the web page 304. The website may include multiple web pages that include hyperlinks capable of transferring a user to the web page 304.

Similarly, and as described above, the web page 304 may include various hyperlinks that, when clicked by a user, transfer the user to other web pages within the website. For example, as shown in FIG. 3, the web page 304 includes hyperlinks 314a and 314b that link to next web pages 316a (i.e., "N1") and 316b (i.e., "N2"), respectively. In some embodiments, a web page can associate a hyperlink to an image or other display element. For example, the web page 304 associates the hyperlink 314c with a product image. If the user clicks the image, the hyperlink 314c transfers the user to the next web page 316c (i.e., "N3").

As described above, the web server communicator 106 can identify a sequence of web pages visited by a website user by either parsing web server log files, or by receiving direct reports from the web server 204 or from a particular web page. In one or more embodiments, the sequence of web pages identified by the web server communicator 106 for a particular user is a navigation path associated with that user. For example, as shown in FIG. 3, a user's navigation path may include the sequence from P1 to web page 304 to N1. Alternatively, the user's navigation path may include the sequence from P2 to web page 304 to N2. In additional or alternative embodiments, the user's navigation path may include any combination or portion of a combination of one of the previous web pages 306a-306d, the web page 304, and/or one of the next web pages 316a-316c. Additionally, in at least one alternative embodiment, the user's navigation path may include a sequence of visited web pages that is larger or shorter than three web pages.

In one or more embodiments, the user's navigation path may include a fallout. As described above, a user fallout occurs when the user leaves a website. For example, as shown in FIG. 3, a user visiting the web page 304 may decide to leave the website that includes the web page 304 and fall out, as indicated by the fallout node 318. The web server communicator 106 can identify this fallout, and include a fallout indicator following the web page 304 in the user's navigation path. As mentioned above, the analytics manager 104 can identify navigation paths associated with all website users for a given period of time.

Once a navigation path has been identified for a particular website user, the analytics manager 104 can identify content experienced by the user within a web page in the user's navigation path. As discussed above, the web content extractor 108 can identify experienced content by analyzing a user's scroll behavior. In one or more embodiments, the web content extractor 108 infers that a user has experienced (i.e., read) content located at scroll positions within a web page where the user pauses for a given amount of time. In other words, the web content extractor 108 can determine that a user has read text at a location where the user has scrolled to within a web page.

For example, a web page may contain more content than can be displayed within a standard computer display causing a user to have to scroll through the web page in order to view the content of the web page in its entirety. As shown in FIG. 3, the user may have to scroll down twice in order to view the bottom of the web page 304, as indicated by the position indicators 310a and 310b. Accordingly, the web content extractor 108 may identify that the time spent at a scroll position above the position indicator 310a, at a scroll position in between the position indicator 310a and the position indicator 310b, and/or at a scroll position below the position indicator 310b. In addition to identifying time spent by the user at a particular scroll position, the web content extractor 108 can also factor scroll speed, horizontal panning, zoom in/zoom out, and scroll backtracking into the analysis of the user's scroll behavior.

Alternatively, the web content extractor 108 can identify content experienced by the user by analyzing the user's eye movements. As described above, the log file data or reported information can include information related to fixations and saccades of the user's eyes while the user experiences web page content. Accordingly, as shown in FIG. 3, the web content extractor 108 may determine that the user's eyes fixated on content above the position indicator 310a, or in between the position indicator 310a and the position indicator 310b, or below the position indicator 310c, or on any specific portion within the web page 304. The web content extractor 108 may recognize eye fixations short enough to be measured in milliseconds.

Although the methods of the web content extractor 108 are described with reference to entire display areas of the web page 304, in one or more embodiments, the web content extractor 108 can identify content experienced by the user with more specificity. For example, the web content extractor 108 can utilize various existing technologies such as scroll behavior and/or eye tracking to identify a single sentence read by the user, or a single image the user looked at. If a content is read or looked at by the user for a time greater than a predefined time threshold then the content is identified as the content experienced by the user with more specificity. In this way, the web content extractor 108 can identify experienced content with a high level of granularity. For example, as shown in FIG. 3, the web content extractor 108 can determine, based on either the user's scroll behavior or eye movements, that the user has experienced the web content 308a, 308b, and 308c.

Once the web content extractor 108 has identified the user's experienced web content, the keyword manager 110 can extract one or more keywords from the experienced web content. As described above, the keyword manager 110 can extract keywords from experienced content by utilizing natural language processing, which in turn parses and analyzes the experienced content for a topic or important concept. For example, the keyword manager 110 can extract the keywords 312a and 312b from the web content 308a experienced by the user. Similarly, the keyword manager 110 can extract the keywords 312c and 312d from the web content 308b, and the keywords 312e and 312f from the web content 308c. As mentioned above, any of the extracted keywords 312a-312f can be words included in the text of the web content 308a, 308b, or 308c, respectively. Alternatively, any of the keywords 312a-312f may be words that are descriptive of a topic or concept embodied within the web contents 308a-308c, respectively.

As discussed above, the keyword manager 110 can also assign a weight to each keyword extracted from the content experienced by a user within a particular web page. For example, as shown in FIG. 3, the keyword manager 110 can assign a weight to each of the keywords 312a-312f extracted from the web content 308a, 308b, and 308c experienced by the user. In one or more embodiments, the keyword manager 110 can assign a weight to a keyword based on the amount of time the user spent at a scroll position or eye fixation associated with the content from which the keyword was extracted. For example, the keyword manager 110 can assign a weight to the keyword 312a based on the amount of time the user spent reading the web content 308a. Similarly, the keyword manager 110 may assign the same weight to the keyword 312b because both the keywords 312a and 312b are associated with the same web content 308a.

Alternatively, and as mentioned above, the keyword manager 110 may take additional factors into account when assigning weights to keywords. For example, the keyword manager 110 may assign a higher weight to the keyword 312c than what was assigned to the keyword 312d because the keyword 312c is closer to the next hyperlink clicked by the user (i.e., hyperlink 314b). In yet another embodiment, the keyword manager 110 may assign a higher weight to the keyword 312f than what was assigned to the keyword 312e based on a positive sentiment within the keyword 312f identified by the keyword manager's 110 natural language processor (e.g., the keyword 312f may be "rugged" while the keyword 312e may be "flimsy").

Figures 4, 5:
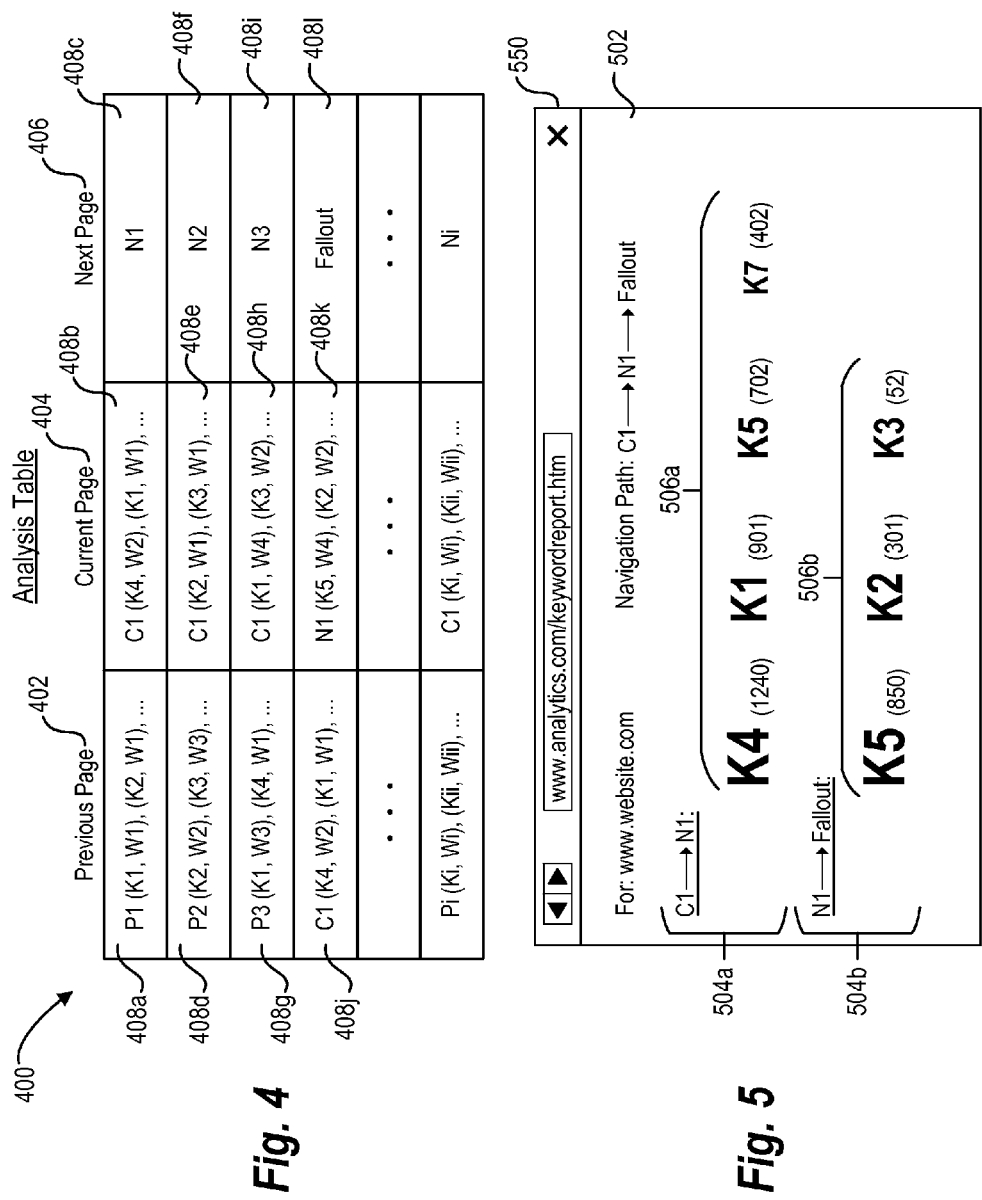
FIG. 4 illustrates an analysis table in accordance with one or more embodiments.
FIG. 5 illustrates an keyword report in accordance with one or more embodiments.

In order to perform a comprehensive analysis of the user-specific data identified by the analytics manager 104, the keyword manager 110 can build an analysis table or other data structure that includes data representative of one or more navigation paths, weighted keywords, and fallouts. For example, as shown in FIG. 4, the analysis table 400 includes a previous page column 402, a current page column 404, and a next page column 406. In one or more embodiments, the analysis table 400 indicates keywords that lead website users to a current page, keywords that lead website users away from a current page, and keywords that lead website users to fall out from the website.

To begin constructing the analysis table 400, the keyword manager 110 can begin with a single user's navigation path and the weighted keywords associated with each web page in the navigation path. For example, as illustrated in FIG. 3, a user's navigation path might include the web pages P1 (e.g., the previous page 306a), C1 (e.g., the web page 304), and N1 (e.g., next page 316a). The keyword manager 110 has extracted keywords K1 and K2, both at a weight of W1, from the content experienced by the user on P1. Also, as described above, the keyword manager 110 can extract the keywords K4 (e.g., keyword 312a) and K1 (e.g., keyword 312b), at weights of W2 and W1, from the content experienced by the user on C1 (e.g., the web page 304) prior to clicking the hyperlink 314a to transfer to N1 (e.g., the next page 316a).

With this information, the keyword manager 110 may simply add the identified information to the analysis table 400 such that every row in the analysis table 400 corresponds to a navigation path. For example, as shown in FIG. 4, some navigation paths have been added to the analysis table 400, such as the navigation path including P1, C1, and N1, as shown in table cells 408a, 408b, and 408c. Similarly, the keyword manager 110 has added the relevant information to the analysis table 400 from the navigation paths including: P2, C1, and N2, as shown in table cells 408d, 408e, and 408f; and P3, C1, and N3, as shown in table cells 408g, 408h, and 408i. Although the analysis table 400 is illustrated with three columns, one will appreciate that the analysis table 400 or one or more rows of the analysis table 400 can be expanded to include any suitable number of rows corresponding to any navigation path through a website.

If the keyword manager 110 encounters user-specific information related to a navigation path already represented in the analysis table 400, then the keyword manager 110 can update the information in the analysis table 400. For example, in one embodiment, the analytics manager 104 may identify a new navigation path of a user that includes C1, N1, and a fallout. In order to add the new keywords and weights associated with this navigation path to the analysis table 400, the keyword manager 110 begins by determining whether the analysis table 400 contains a cell in the next page column 406 of the analysis table assigned to N1 (e.g., table cell 408c) that has a corresponding cell in the current page column 404 in the same row assigned to C1 (e.g., table cell 408b). As described above, at least one user has already transferred from C1 to N1. Accordingly, the keyword manager 110 adds the new keywords to the existing list of keywords associated with C1 in the identified cell (e.g., table cell 408b). As discussed above, the existing list of keywords associated with C1 in the table cell 408b are representative of keywords that may be indicative of a reason that the user navigates from C1 to N1.

If the existing list of keywords associated with C1 in the same row as N1 already contains one of the new keywords that the keyword manager 110 is trying to add, the keyword manager can simply add the weight of the new keyword to the weight of the existing keyword. For example, if the new set of keywords associated with C1 includes the keyword K4 with a weight of W4, the keyword manager 110 can add the weight W4 to the existing weight assigned to K4 (e.g., W2, as shown in table cell 408b). Accordingly, after the keyword manager 110 adds the two weights together, the resulting weight for the keyword K4 will be W6. This means that over time, keywords that are identified more often will have larger weights.

If the analysis table 400 does not include information representative of a step in the new navigation path, the keyword manager 110 can add a new row to the analysis table 400. For example, prior to the identification of the new navigation path, the analysis table 400 did not include a row including data representative of the user's transfer from N1 to a fallout. Accordingly, the keyword manager 110 can add data representative of the user's transfer from the web page N1 to a fallout by including N1 and its associated keywords and weights to a cell (e.g., table cell 408k) under the current page column 404 in the new row. Next, the keyword manager can include a fallout cell (e.g., table cell 408l) to the analysis table 400 in the new row under the next page column 406. Additionally or alternatively, the keyword manager 110 can copy the keyword list from table cell 408b into a cell (e.g., table cell 408j) in the new row under the previous page column 402 of the analysis table 400, or aggregate the data from table cell 408b with data for table cell 408j. The keyword manager 110 can repeat the processes above for all navigation paths identified for all website users of a particular website over a given time.

Once the keyword manager 110 builds the analysis table 400 as shown in FIG. 4, the keyword manager 110 can utilize the analysis table 400 to generate one or more reports. For example, as shown in FIG. 5, the keyword manager 110 can generate a report for a website manager and provide the report via a web page 502 for display within a web browser 500 associated with the website manager's client computing device (i.e., client computing device 206d). Additionally, the web page 502 can include additional controls that enable the website manager to configure report parameters and interact with the provided reports. In alternative embodiments, the keyword manager 110 can provide one or more reports to the website manager via a native application run by the client computing device 206d, or by any other report providing means. The reports generated by the keyword manager 110 can by utilized by the user 208d to improve how website visitors experience the website, which in turn leads to reduced user fallout, increased purchasing, etc.

In one or more embodiments, the keyword manager 110 can provide a variety of reports associated with or based on the analysis table 400 or other analyzed data. For example, a website manager can utilize the web browser 500 to navigate to the web page 502 to view various reports based on the analysis table 400. As shown in FIG. 5, the keyword manager 110 can provide a next page flow report 504a and a fallout report 504b. In additional embodiments, the keyword manager 110 can provide additional or alternative reports in addition to the next page flow report 504a and the fallout report 504b. In at least one embodiment, the web page 502 can include various input controls that allow a website manager to specify web server log files, time parameters, user parameters, and other features in order to instruct the analytics manager 104 to provide a specific report.

In one or more embodiments, the reports provided by the keyword manager 110 can include a next page flow report. In one or more embodiments, the next page flow report 504a provides information related to prominent keywords that influences website users transition from one web page to another. For example, as shown in FIG. 5, the next page flow report 504a provides a connecting keywords tag cloud 506a for keywords that influenced website users' transitions from web page C1 (e.g., web page 304 from FIG. 3) to web page N1 (e.g., next page 316a from FIG. 3). In one or more embodiments, the keyword manager 110 can configure the connecting keywords tag cloud 506a such that the keyword with the heaviest weight is listed first (e.g., if keyword K4 has a heavier weight than keyword K1 in table cell 408b of the analysis table 400 in FIG. 4).

If a website manager configures the next page flow report 504a to include only prominent keywords related to transitions from one web page to another web page, the keyword manager 110 can construct the connecting keywords tag cloud 506a by identifying the keywords with the heaviest weights in the list of keywords associated with that particular table cell in the analysis table (i.e., table cell 408b). In at least one embodiment, the keyword manager 110 can configure the connecting keywords tag cloud 506a such that the displayed font size of a keyword directly corresponds to the weight of the keyword (i.e., keywords with heavier weights have a larger font size than keywords with lighter weights). Additionally, in one or more embodiments, the keyword manager 110 can include an indicator as to how many user click-throughs are based on users experiencing a particular keyword (i.e., 1240 user click-throughs from C1 to N1 are based on user experiencing the keyword K4). Although the connecting keywords tag cloud 506a provides information related to prominent keywords that influenced website users' transitions from C1 to N1, in additional or alternative embodiments, a connecting keyword tag cloud can provide information related to prominent keywords that influenced website users transitions to N1 from any other web page in the website. For example, in one alternative embodiment, the keyword manager 110 can identify a table cell in the current page column 404 corresponding to every instance of the web page N1 in the next page column 406, concatenate the keyword lists from all of the identified table cells, and identify the most heavily weighted keywords in the concatenated keyword list.

In one or more embodiments, the reports provided by the keyword manager 110 can further include a fallout report. For example, as shown in FIG. 5, the fallout report 504b provides information related to prominent keywords that are experienced by users just before they exited from the website. More specifically, the fallout report 504b provides a connecting keywords tag cloud 506b that indicates the prominent keywords experienced by users on the webpage N1 just before they exited from the website (i.e., keyword K5 has a heavier weight than keyword K2).

Rather than providing fallout keywords from a particular web page, in at least one alternative embodiment, the keyword manager 110 can provide a fallout report that includes prominent keyword experienced by website users from all exit points within the website. For example, the keyword manager 110 can identify a table cell in the current page column 404 corresponding to every instance of the fallout node 408l in the next page column 406. The keyword manager 110 can then concatenate the keyword lists from all of the identified table cells, and then identify the most heavily weighted keywords in the concatenated keyword list. In one embodiment, the most heavily weighted keywords identified by the keyword manager 110 from this concatenated list are keywords that were most often experienced by website users immediately preceding their exit from the website.

In one or more embodiments, the reports provided by the keyword manager 110 can further include a previous page report (not shown in FIG. 5). The previous page report provides information about the prominent keywords experienced by website users immediately before transitioning to a particular web page within the website. For example, the keyword manager 110 can generate a previous page report for a particular web page by identifying a table cell in the current page column 404 corresponding to every instance of the particular web page in the next page column 406. The keyword manager 110 can then concatenate the keyword lists from all of the identified table cells, and then identify the most heavily weighted keywords in the concatenated keyword list. In one embodiment, the most heavily weighted keywords identified by the keyword manager 110 from this concatenated list are keywords that were most often experienced by website users immediately preceding their transfer to the particular page. In additional or alternative embodiments, the previous page report can provide information about the prominent keywords experienced by website users before they transition to one of a group of web pages.

In one or more embodiments, the reports provided by the keyword manager 110 can further include a prominent entry and exit keyword report (not shown in FIG. 5). The prominent entry and exit keyword report provides information about the prominent keywords experienced by website users immediately before transitioning to a particular web page and immediately before transitioning away from the particular web page. For example, the keyword manager 110 can generate the prominent entry and exit keyword report for a particular web page by identifying data corresponding to every instance of the particular web page in the current page column 404 in the analysis table 400. The keyword manager 110 can then concatenate the keyword lists from all of the identified table cells, and then identify the most heavily weighted keywords in the concatenated keyword list. The most heavily weighted keywords identified by the keyword manager 110 from this concatenated list represent prominent entry keywords for the particular page. The keyword manager 110 can then identify a table cell in the current page column 404 corresponding to every instance of the particular web page in the current page column 404. The keyword manager 110 can then concatenate the keyword lists from all of the identified table cells, and then identify the most heavily weighted keywords in the concatenated keyword list. The most heavily weighted keywords identified by the keyword manager 110 from this concatenated list represent prominent exit keywords for the particular page.

In one or more embodiments, the reports provided by the keyword manager 110 can further include a summarized full path report (not shown in FIG. 5). The summarized full path report provides information about the prominent keywords experienced by website users who moved in a particular navigation path through the website. For example, as described above, a user may transition through a website by first visiting the web page P1, followed by the web page C1, followed by the web page N1. Accordingly the user's navigation path would be P1, then C1, and then N1. In at least one embodiment, the keyword manager 110 can generate a summarized full path report for a particular navigation path by simply identifying the row in the analysis table 400 that corresponds to the particular navigation path, and providing the keywords listed in the table cells of that row.

In one or more embodiments, the particular navigation path for which the keyword manager 110 is generating a summarized full path report may not be wholly contained within a single row of the analysis table 400. In that case, the keyword manager 110 can identify a table cell in the current page column 404 that corresponds with a table cell in the next page column 406 that together correspond with the first and second step in the particular navigation path. Next the keyword manager 110 can identify another row in the analysis table 400 with a table cells in the previous page column 402, the current page column 404, and the next page column 406 that correspond with the second, third, and fourth steps in the particular navigation path, respectively. The keyword manager 110 can continue this process until the keyword manager 110 has identified sequential table cells in the analysis table 400 corresponding with each step in the particular navigation path. The keyword manager 110 can then provide the keywords listed in each identified sequential table cell.

In one or more embodiments, the reports provided by the keyword manager 110 can further include an enhanced time spent report (not shown in FIG. 5). The enhanced time spent report provides information about how much time user's spend in association with various keywords on a particular web page. For example, the keyword manager 110 can generate an enhanced time spent report for a particular web page by identifying the table cells within the current page column 404 corresponding to every instance of the particular web page in the analysis table 400. The keyword manager 110 can then concatenate the lists of keywords contained within the identified table cells to form a list of keywords representing every keyword the website users experienced on the particular page prior to transitioning to any other page. The keyword manager 110 can order and present this list of keywords along with the weight of each keyword as part of the enhanced time spent report. The enhanced time spent report can further include a key explaining amounts of time that correspond with the weights of the keywords in the list (e.g., a keyword with a weight of W10 may have been viewed by all website users collectively for 5 minutes over a one-hour period of time).

Figure 6:
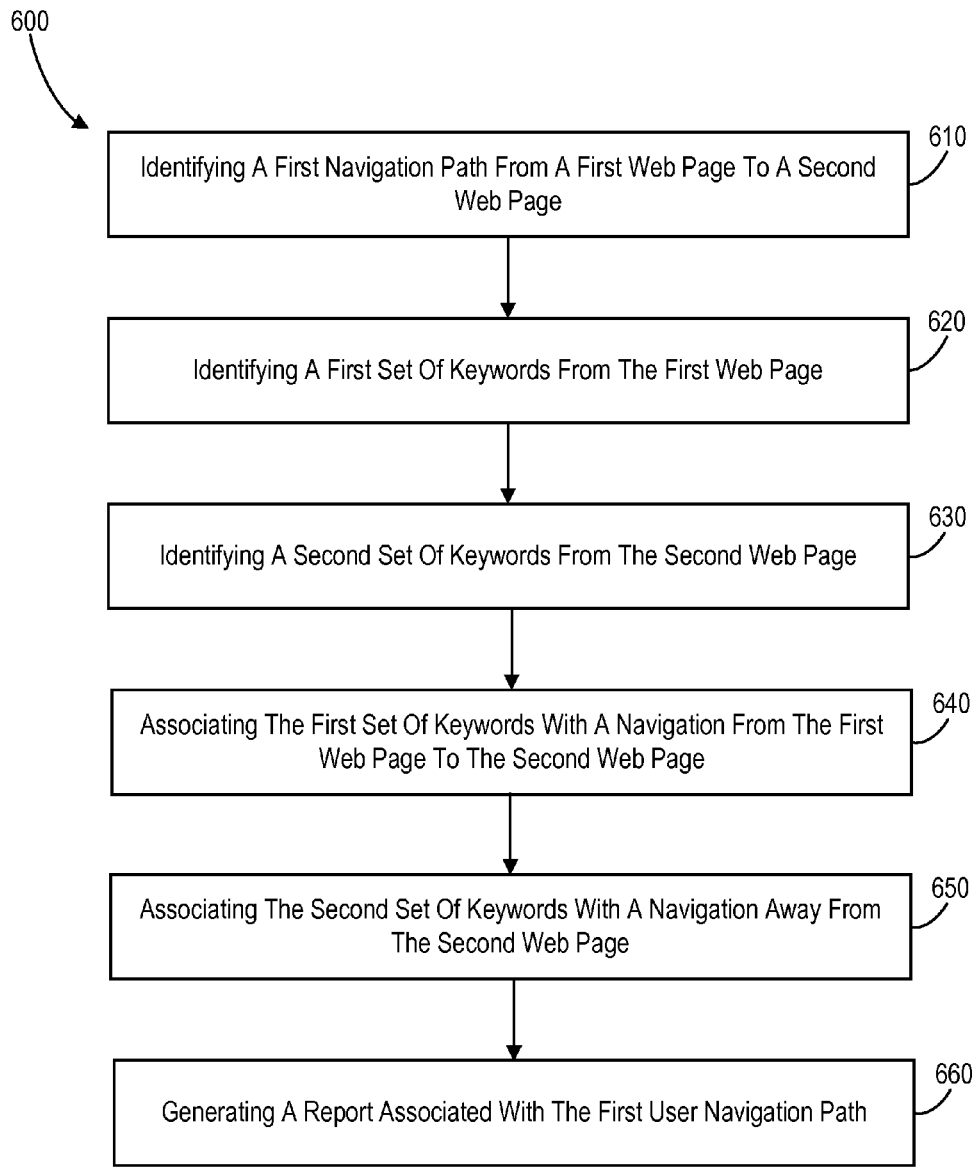
FIG. 6 illustrates a flowchart of a series of acts in a method of identifying and providing actionable keyword data in accordance with one or more embodiments.
Figure 7:
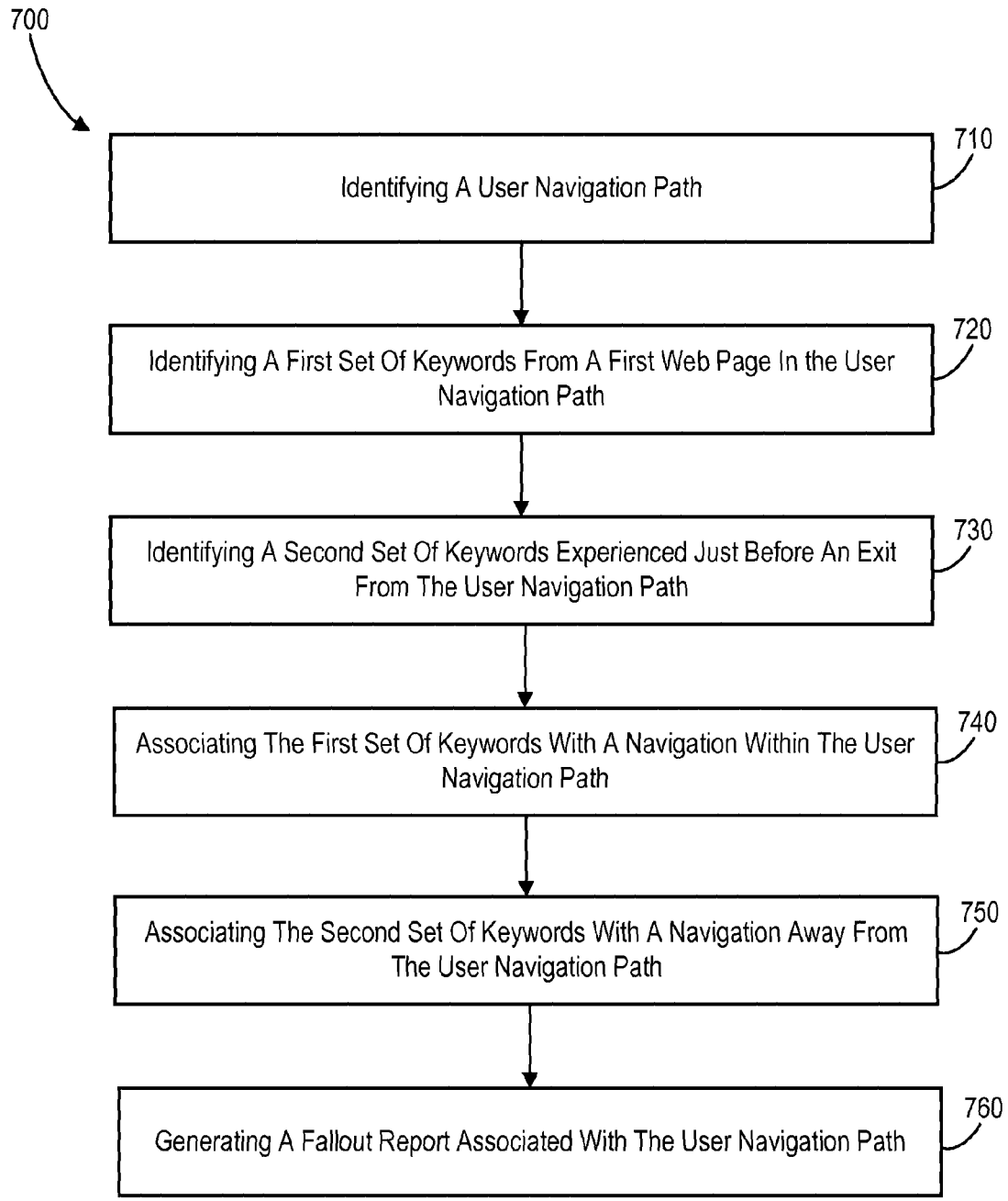
FIG. 7 illustrates a flowchart of a series of acts in a method of identifying and providing actionable keyword data in accordance with one or more embodiments.

FIGS. 1-5, the corresponding text, and the examples, provide a number of different systems and devices for providing actionable data related to website keywords. In addition to the foregoing, one or more embodiments can also be described in terms of flowcharts comprising acts and steps in a method for accomplishing a particular result. For example, FIGS. 6 and 7 illustrate flowcharts of exemplary methods in accordance with one or more embodiments. The methods described in relation to FIGS. 6 and 7 may be performed with less or more steps/acts or the steps/acts may be performed in differing orders. Additionally, the steps/acts described herein may be repeated or performed in parallel with one another or in parallel with different instances of the same or similar steps/acts.

FIG. 6 illustrates a flowchart of one example method 600 of identifying and providing actionable keyword data based on website traffic. The method 600 includes an act 610 of identifying a first navigation path from a first web page to a second web page. In particular, the act 610 can involve identifying a first user navigation path comprising navigation from a first web page to a second web page by a user. For example, in one or more embodiments, identifying the first user navigation path comprising the first web page and the second web page navigated by the user comprises parsing one or more web server log files.

The method 600 further includes an act 620 of identifying a first set of keywords from the first web page. In particular, the act 620 can involve identifying a first set of keywords from content experienced by the user from the first web page. For example, in one or more embodiments, identifying a first set of keywords from content experienced by the user from the first web page comprises monitoring scroll behavior of the user to identify content experienced by the user at a particular scroll position within the first web page. Alternatively, in at least one embodiment, identifying a first set of keywords from content experienced by the user from the first web page comprises tracking eye movement of the user to identify a portion of content within the first web page corresponding with the eye movement. Additionally, in at least one embodiment, identifying the first set of keywords from content experienced by the user from the first web page further comprises extracting the first set of keywords from content experienced by the user at the particular scroll position within the first web page utilizing a natural language processing engine.

The method 600 also includes an act 630 of identifying a second set of keywords from the second web page. In particular, the act 630 can involve identifying a second set of keywords from content experienced by the user from the second web page. For example, in one or more embodiments, identifying a second set of keywords from content experienced by the user from the second web page comprises monitoring scroll behavior of the user to identify content experienced by the user at a particular scroll position within the second web page. Alternatively, in at least one embodiment, identifying a second set of keywords from content experienced by the user from the second web page comprises tracking eye movement of the user to identify a portion of content within the second web page corresponding with the eye movement. Additionally, in at least one embodiment, identifying the second set of keywords from content experienced by the user from the second web page further comprises extracting the second set of keywords from content experienced by the user at the particular scroll position within the second web page utilizing a natural language processing engine. Furthermore, in at least one embodiment, the method 600 further includes assigning a weight to each of the first set of keywords relative to a time spent by the user at the particular scroll position within the first web page. Additionally, the method 600 includes an act 640 of associating the first set of keywords with a navigation from the first web page to the second web page, and an act 650 of associating the second set of keywords with a navigation away from the second web page.

The method 600 further includes an act 660 of generating a report associated with the first user navigation path. In particular, the act 660 can involve generating a report associated with the first user navigation path, wherein the report is based, at least in part, on the association of the first set of keywords with the navigation from the first web page to the second web page, and on the association of the second set of keywords with the navigation away from the second web page. In one or more embodiments, the report can be provided via a dedicated display.

The method 600 can further include an act of: identifying a second user navigation path comprising navigation from the second web page to a third web page by the user, identifying a third set of keywords from content experienced by the user from the third web page, assigning a weight to each of the third set of keywords based on a time spent by the user at a particular scroll position within the third web page, associating of the second set of keywords with a navigation from the second web page to the third web page, and associating the third set of keywords with a navigation away from the third web page. For example, in one or more embodiments, generating a report associated with the user navigation path comprises generating one or more of a next page keyword report, a previous page keyword report, or a prominent keyword report. Accordingly, in at least one embodiment, generating a next page keyword report comprises generating a display of keywords associated with navigation away from the second web page.

Furthermore, in at least one embodiment, generating a previous page keyword report comprises generating a display of keywords associated with navigation to the second web page. Additionally, in at least one embodiment, generating a prominent keyword report comprises: identifying one or more keywords from the first set of keywords having a weight above a particular threshold, and generating a display of the identified one or more keywords. Finally, in one or more embodiments, generating a report comprises generating a display of a connecting keywords tag cloud.

FIG. 7 illustrates a flowchart of one example method 700 of identifying and providing actionable keyword data based on website traffic. The method 700 includes an act 710 of identifying a user navigation path. In particular, the act 710 can involve identifying a user navigation path comprising a plurality of web pages including at least a first web page and a second web page of a website navigated by a user, wherein the second web page represents the user's exit point from the website.

The method 700 further includes an act 720 of identifying a first set of keywords from the first web page in the user navigation path. In particular, the act 720 can involve identifying a first set of keywords from content experienced by the user from the first web page. In one or more embodiments, identifying a first set of keywords from content experienced by the user from the first web page comprises monitoring scroll behavior of the user to identify content experienced by the user at a particular scroll position within the first web page. Furthermore, in at least one embodiment, identifying a first set of keywords from content experienced by the user from the first web page further comprises extracting the first set of keywords from content experienced by the user at the particular scroll position within the first web page utilizing a natural language processing engine.

The method 700 also includes an act 730 of identifying a second set of keywords experienced just before an exit from the user navigation path. In particular, the act 730 can involve identifying a second set of keywords from content experienced by the user from the second web page within a threshold amount of time preceding the user's exit from the website. In one or more embodiments, identifying a second set of keywords from content experienced by the user from the second web page comprises monitoring scroll behavior of the user to identify content experienced by the user at a particular scroll position within the second web page before exiting the website. Furthermore, in at least one embodiment, identifying a second set of keywords from content experienced by the user from the second web page further comprises extracting the second set of keywords from content experienced by the user at the particular scroll position within the second web page utilizing a natural language processing engine. Additionally, in at least one embodiment, the method 700 also includes associating a weight with each of the first set of keywords and each of the second set of keywords, wherein the weight assigned to a particular keyword within the first set of keywords or the second set of keywords is relative to the time spent by the user at the particular scroll position indicating the content experienced by the user from which the particular keyword is identified.

Furthermore, the method 700 includes an act 740 of associating the first set of keywords with a navigation within the user navigation path, and an act 750 of associating the second set of keywords with a navigation away from the user navigation path. In particular, the act 740 can involve associating the first set of keywords with a navigation from the first web page to the second web page. Similarly, in particular, the act 750 can involve associating the second set of keywords with a navigation away from the website.

The method 700 also includes an act 760 of generating a fallout report associated with the user navigation path. In particular, the act 760 can involve generating a fallout report associated with the user navigation path, wherein the fallout report is based, at least in part, on the association of the second set of keywords with the navigation away from the website. In one or more embodiments, generating a fallout report comprises generating a display of the keywords associated with the user's exit from the website.

In one or more embodiments, the method 700 can include an act of: identifying one or more additional user navigation paths navigated by additional users, wherein the one or more additional user navigation paths each include a navigation away from the website, identifying a third set of keywords from content experienced by each of the additional users within a threshold amount of time before navigating away from the website, associating the third set of keywords with the navigation away from the website, and updating the fallout report to generate a display including the third set of keywords. Furthermore, in one or more embodiments, generating a full path report, wherein generating a full path report comprises: identifying, from within the user navigation path, a sequence of web pages navigated by the user starting at the user's entry point into the website and ending at the user's exit point from the website, identifying, for each of the web pages indicated in the sequence of web pages navigated by the user, a set of keywords from content experienced by the user on each web page, and providing, for each of the web pages indicated in the sequence of web pages navigated by the user, a display of the set of keywords.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
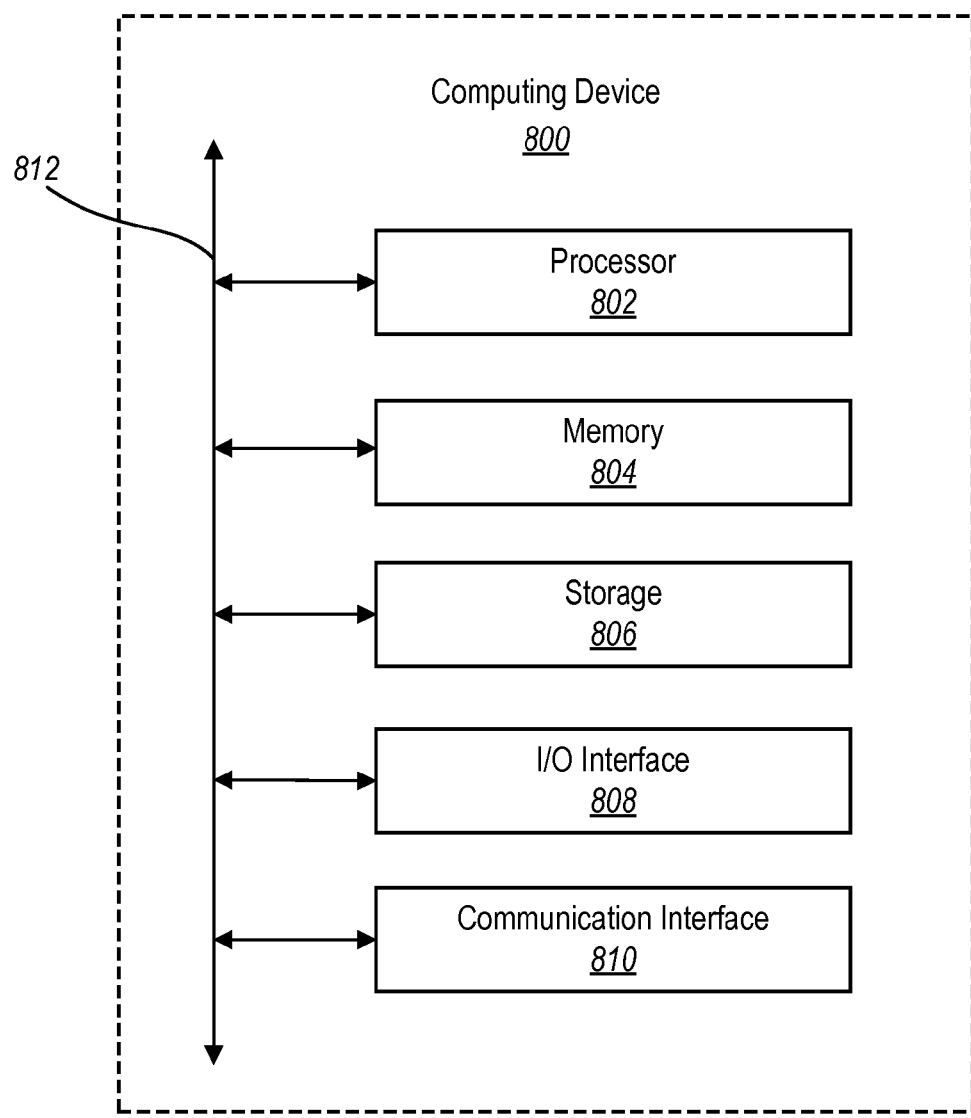
FIG. 8 illustrates a block diagram of an exemplary computing device in accordance with one or more embodiments.

FIG. 8 illustrates a block diagram of an exemplary computing device 800 that may be configured to perform one or more of the processes described above. One will appreciate that the social media marketing system 104 may be implemented by one or more computing devices such as the computing device 800. As shown by FIG. 8, the computing device 800 can comprise a processor 802, memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In particular embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In particular embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, the storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In particular embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from the computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for analyzing web traffic, a method for enhancing analytics of user navigation of a website comprising:
    identifying a first user navigation path comprising navigation from a first web page to a second web page by a user;
    identifying a first set of keywords from content experienced by the user from the first web page;
    identifying a second set of keywords from content experienced by the user from the second web page;
    associating the first set of keywords with a navigation from the first web page to the second web page;
    associating the second set of keywords with a navigation away from the second web page; and
    generating a report associated with the first user navigation path, wherein the report is based, at least in part, on the association of the first set of keywords with the navigation from the first web page to the second web page, and on the association of the second set of keywords with the navigation away from the second web page.

2. The method as recited in claim 1, wherein identifying the first user navigation path comprising the first web page and the second web page navigated by the user comprises parsing one or more web server log files.

3. The method as recited in claim 1, wherein
    identifying a first set of keywords from content experienced by the user from the first web page comprises monitoring scroll behavior of the user to identify content experienced by the user at a particular scroll position within the first web page, and
    identifying a second set of keywords from content experienced by the user from the second web page comprises monitoring scroll behavior of the user to identify content experienced by the user at a particular scroll position within the second web page.

4. The method as recited in claim 1, wherein
    identifying a first set of keywords from content experienced by the user from the first web page comprises tracking eye movement of the user to identify a portion of content within the first web page corresponding with the eye movement, and
    identifying a second set of keywords from content experienced by the user from the second web page comprises tracking eye movement of the user to identify a portion of content within the second web page corresponding with the eye movement.

5. The method as recited in claim 3, wherein
identifying the first set of keywords from content experienced by the user from the first web page further comprises extracting the first set of keywords from content experienced by the user at the particular scroll position within the first web page utilizing a natural language processing engine, and
identifying the second set of keywords from content experienced by the user from the second web page further comprises extracting the second set of keywords from content experienced by the user at the particular scroll position within the second web page utilizing the natural language processing engine.

6. The method as recited in claim 3, further comprising assigning a weight to each of the first set of keywords relative to a time spent by the user at the particular scroll position within the first web page.

7. The method as recited in claim 1, further comprising:
identifying a second user navigation path comprising navigation from the second web page to a third web page by the user;
identifying a third set of keywords from content experienced by the user from the third web page;
assigning a weight to each of the third set of keywords based on a time spent by the user at a particular scroll position within the third web page;
associating of the second set of keywords with a navigation from the second web page to the third web page; and
associating the third set of keywords with a navigation away from the third web page.

8. The method as recited in claim 1, wherein generating the report associated with the first user navigation path comprises generating one or more of a next page keyword report, a previous page keyword report, or a prominent keyword report.

9. The method as recited in claim 8, wherein generating the next page keyword report comprises generating a display of keywords associated with navigation away from the second web page.

10. The method as recited in claim 8, wherein generating the previous page keyword report comprises generating a display of keywords associated with navigation to the second web page.

11. The method as recited in claim 8, wherein generating the prominent keyword report comprises:
identifying one or more keywords from the first set of keywords having a weight above a particular threshold; and
generating a display of the identified one or more keywords.

12. The method as recited in claim 8, wherein generating the report comprises generating a display of a connecting keywords tag cloud.

13. In a digital medium environment for analyzing web traffic, a method for enhancing analytics of user navigation of websites comprising:
identifying a user navigation path comprising a plurality of web pages including at least a first web page and a second web page of a web site navigated by a user, wherein the second web page represents an exit point of the user from the website;
identifying a first set of keywords from content experienced by the user from the first web page;
identifying a second set of keywords from content experienced by the user from the second web page within a threshold amount of time preceding the exit point of the user from the web site;
associating the first set of keywords with a navigation from the first web page to the second web page;
associating the second set of keywords with a navigation away from the website; and
generating a fallout report associated with the user navigation path, wherein the fallout report is based, at least in part, on the association of the second set of keywords with the navigation away from the website.

14. The method as recited in claim 13, wherein
identifying the first set of keywords from content experienced by the user from the first web page comprises monitoring scroll behavior of the user to identify content experienced by the user at a particular scroll position within the first web page, and
identifying the second set of keywords from content experienced by the user from the second web page comprises monitoring scroll behavior of the user to identify content experienced by the user at a particular scroll position within the second web page before exiting the website.

15. The method as recited in claim 14, wherein
identifying the first set of keywords from content experienced by the user from the first web page further comprises extracting the first set of keywords from content experienced by the user at the particular scroll position within the first web page utilizing a natural language processing engine, and
identifying the second set of keywords from content experienced by the user from the second web page further comprises extracting the second set of keywords from content experienced by the user at the particular scroll position within the second web page utilizing the natural language processing engine.

16. The method as recited in claim 15, further comprising associating a weight with each of the first set of keywords and each of the second set of keywords, wherein the weight assigned to a particular keyword within the first set of keywords or the second set of keywords is relative to a time spent by the user at the particular scroll position indicating the content experienced by the user from which the particular keyword is identified.

17. The method as recited in claim 16, wherein generating ft the fallout report comprises generating a display of the keywords associated with the exit point of user from the website.

18. The method as recited in claim 17, further comprising:
identifying one or more additional user navigation paths navigated by additional users, wherein the one or more additional user navigation paths each include an additional navigation away from the web site;
identifying a third set of keywords from content experienced by each of the additional users within the threshold amount of time before navigating away from the website;
associating the third set of keywords with the navigation away from the website; and
updating the fallout report to generate an additional display including the third set of keywords.

19. The method as recited in claim 18, further comprising generating a full path report, wherein generating the full path report comprises:
identifying, from within the user navigation path, a sequence of web pages navigated by the user starting at an entry point of the user into the web site and ending at the exit point of the user from the website;

identifying, for each of the web pages indicated in the sequence of web pages navigated by the user, a set of keywords from content experienced by the user on each web page; and providing, for each of the web pages indicated in the sequence of web pages navigated by the user, a further display of the set of keywords.

20. In a digital medium environment for analyzing web traffic, a system for enhancing analytics of user navigation of a website comprising:

at least one processor; and at least one non-transitory computer-readable storage medium storing instructions thereon that, when executed by the at least one processor, cause the system to:

identify a first user navigation path comprising navigation from a first web page to a second web page by a user;

identify a first set of keywords from content experienced by the user from the first web page;

identify a second set of keywords from content experienced by the user from the second web page;

associate the first set of keywords with a navigation from the first web page to the second web page;

associated the second set of keywords with a navigation away from the second web page; and generate a report associated with the first user navigation path, wherein the report is based, at least in part, on the association of the first set of keywords with the navigation from the first web page to the second web page, and the association of the second set of keywords with the navigation away from the second web page.

* * * * *